(12) United States Patent
Bateman

(10) Patent No.: US 6,817,165 B1
(45) Date of Patent: Nov. 16, 2004

(54) WEANING DEVICE AND HALTER ASSEMBLY

(76) Inventor: Linda C. Bateman, 18151 30$^{th}$ Ave., Chippewa Falls, WI (US) 54729

( * ) Notice: Subject to any disclaimer, the term of this patent is extended or adjusted under 35 U.S.C. 154(b) by 51 days.

(21) Appl. No.: 10/410,712

(22) Filed: Apr. 9, 2003

Related U.S. Application Data

(60) Provisional application No. 60/372,518, filed on Apr. 12, 2002.

(51) Int. Cl.$^7$ .............................. A01K 15/04; B68B 1/02
(52) U.S. Cl. ............................................ 54/24; 119/828
(58) Field of Search ..................... 54/24, 71; 119/828, 119/821, 831, 833, 837

(56) References Cited

U.S. PATENT DOCUMENTS

| | | | |
|---|---|---|---|
| 431,828 A | | 7/1890 | Walbridge |
| 563,721 A | * | 7/1896 | Schow et al. ............... 119/828 |
| 770,688 A | * | 9/1904 | Lord et al. .................. 119/828 |
| 843,586 A | | 2/1907 | Dean |
| 911,706 A | | 2/1909 | Douglass |
| 968,279 A | | 8/1910 | Steele et al. |
| 1,005,666 A | | 10/1911 | Speck |
| 1,105,767 A | | 8/1914 | Goff |
| 1,122,587 A | | 12/1914 | Grady |
| 1,234,839 A | * | 7/1917 | Welch ......................... 119/828 |
| 1,276,462 A | * | 8/1918 | Welch et al. ............... 119/828 |
| 1,335,118 A | | 3/1920 | Link |
| 1,472,542 A | * | 10/1923 | Bailie ......................... 119/828 |
| 1,504,063 A | | 8/1924 | Lenhart |
| 1,918,647 A | | 7/1933 | Jensen |
| 2,422,308 A | | 6/1947 | Masbruch |
| 2,457,246 A | | 12/1948 | Lawrence |
| 2,672,846 A | * | 3/1954 | Maynard ..................... 119/828 |
| 2,940,425 A | * | 6/1960 | Dykens ....................... 119/837 |
| 3,042,036 A | * | 7/1962 | Abadjieff .................... 119/828 |
| 5,615,539 A | * | 4/1997 | Graham ......................... 54/24 |

\* cited by examiner

*Primary Examiner*—Michael J. Carone
*Assistant Examiner*—Elizabeth Shaw
(74) *Attorney, Agent, or Firm*—Tipton L. Randall

(57) ABSTRACT

A device for weaning a young animal from nursing from its mother is disclosed. The device includes a halter having a plurality of blunt projections. When the young animal attempts to nurse from the mother, the blunt projections cause discomfort to the mother, and she quickly breaks the offspring from nursing.

21 Claims, 9 Drawing Sheets

WEANING DEVICE AND HALTER ASSEMBLY

CROSS-REFERENCE TO RELATED APPLICATIONS, IF ANY

This application claims the benefit under 35 U.S.C. §119(e) of co-pending provisional application Ser. No. 60/372,518, filed Apr.12, 2002. Application Serial No. 60/372,518 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a device for weaning a young animal from its mother, and more particularly, a halter with an attachment for weaning a young animal from its mother.

2. Background Information

The state of the art includes various devices for weaning a young animal from its mother. This technology is believed to have significant limitations and shortcomings, including, but not limited to, that the devices can be injurious to both the mother and the young animal and are marginally effective and costly to manufacture.

For this and other reasons, a need exists for the present invention. The invention provides a simple device for weaning a young animal from its mother, which is believed to fulfill the need and to constitute an improvement over the background technology.

All United States patents and patent applications, and all other published documents mentioned anywhere in this application are incorporated by reference in their entirety. Some examples of animal control devices, for which patents have been granted, include the following.

Walbridge, in U.S. Pat. No. 431,828, describes a leather halter having a continuous chain of metal links riveted to the exterior of all parts. With the halter fitted on the head of an animal, a padlock secures the halter in place. Thus, the animal can be chained to a stationary anchor and be protected from theft or from escaping the halter.

In U.S. Pat. No. 843,586, Dean discloses a cattle yoke having a wire collar that fits around the animal's neck. A set of straps connects the collar to a muzzle loop that fits around the animal's muzzle. Another twisted wire piece is attached to the loop near the animal's forehead. The wire piece extends down the animal's face between the eyes and curves upwardly away from the muzzle and mouth. The function of the upwardly curved wires is not stated.

Douglas, in U.S. Pat. No. 911,706, describes a hog poke including a head enclosing halter having a nose band that fits around the hog's snout. The halter has triangular wire hooks that extend perpendicularly above and below the hog's snout. The function of the hooks is to prevent the hog from going through, under or over wire fences or rail fences.

In U.S. Pat. No. 968,279, Steele et al. disclose a cattleguard and halter that includes a metal band with leather padding that encircles the cow's nose. A metal strip with an upturned end runs up the cow's face between the eyes, while a downward hanging bar with a bent end extends from the metal band beneath the cow's chin. Again, the function of the metal strip end and the bent bar is to engage a fence if a cow attempts to get through it.

Speck, in U.S. Pat. No. 1,005,666, describes a veterinary dental halter that includes a nasal band having two halves connected by a set of spring biased bolts. Each band half has an eyelet for connecting a rope or chain. Thus, the head of an animal can be held steady by fastening the nasal band to stationary objects.

In U.S. Pat. No. 1,105,767, Goff discloses an animal poke and weaning halter device. The halter fastens to an animal's head in standard fashion. A jointed linear bar is rotatably secured to the nose band and the head band of the halter and extends vertically between the animal's eyes. Pushing on the bar above the animal's head rotates the bar into the animal's nose. A weaning flap can be attached to the device at the hose band to prevent a calf from sucking milk from the mother.

Grady, in U.S. Pat. No. 1,122,587, describes a halter having a leather padded nose band make of metal. Several outward facing curved hooks attached to the nose band prevent the animal from putting its head through a fence.

In U.S. Pat. No. 1,335,118, Link discloses another animal poke or halter to prevent an animal from reaching through wire fences to graze. The device includes a heavy leather strap that encircles the nose and under the lower jaw of the head of the animal. The strap is held in position by a halter strap positioned around the animal's head behind the ears. A W-shaped wire is secured to the strap and positioned atop the animal's nose. The wire has sharpened ends that protrude toward the nose of the animal. Pressure on the W-shaped wire causes the sharpened ends to impale the anlimal's nose. The device is described as also useful for weaning an animal from its mother.

Lenhart, in U.S. Pat. No. 1,504,063, describes another cow poke including a wire or metal halter unit having two protruding rods with hook ends. One rod extends upwardly from between the animal's eyes while the other rod hangs downwardly over the animal's nose and mouth with a pointed end. The hooked rods catch on fences if the animal tries to cross them. The device is also described as useful for weaning an animal from its mother.

In U.S. Pat. No. 1,918,647, Jensen discloses another animal poke having a basic halter structure that includes a pair of T-shaped rods. One rod extends from the halter nose band and between the animal's eyes to a curved pointed end above the animal's head. The other rod hangs from beneath the animal's chin with a forward curved pointed end. The curved rod ends engage any fence the animal tries to penetrate.

Masbruch, in U.S. Pat. No. 2,422,308, describes a halter having a nose band made of two longer metal links connected to a center link atop the animal's nose. A pull chain tightens the metal nose band against the animal's nose to provide control.

In U.S. Pat. No. 2,457,246, Lawrence discloses a breaking lead halter for cattle that includes a head strap secured to a pair of arcuate side members that are hinged together at one end to form a nose loop. Each side member has a slot at the end opposite the hinge. Each side member has a post with a ring adjacent the hinge. A chain connecting the two side member ends and running through one post ring allows the side members to be pulled tightly around the chin and nose of the animal for control.

The applicant has devised a device which quickly weans a young animal from nursing its mother. The device is simple to make and easily attached to the young animal. The device is not injurious to either the mother or the young animal, yet functions to quickly wean the young animal from nursing, without trauma to either the mother or the young animal. The device is applicable to a wide variety of animals and can be sized to fit both larger and smaller animal species.

SUMMARY OF THE INVENTION

One embodiment of the invention is directed to a device that is attached to the nose strap of a halter for an animal. The halter is secured about the head of a young animal, such as a horse, llama, cow, sheep, goat, etc., in the normal fashion. The device provides a number of blunt projections that extend outwardly from the halter nose strap. When the young animal attempts to nurse from the mother, the blunt projections poke the mother, thereby causing the mother to move away from the young animal. Thus, the young animal is quickly weaned from the mother. The present invention allows the weaning process to occur without having to separate the mother from the young animal. The invention reduces stress and anxiety to both mother and offspring, as well as possible physical injury to the animals.

The device for attachment to the nose strap of the halter includes a linear, rectangular sheet of a sturdy material. A plurality of the blunt projections, such as copper rivets or rigid plastic connectors with a flat, enlarged base, are inserted through the sheet material with the projections on a common side thereof. A fastening means secures the linear sheet member to an outer surface of the halter nose strap, with the plurality of blunt projections extending opposite the nose strap.

In a further embodiment of the invention, a planar flap member is secured to the linear sheet member. The planar flap member has a plurality of the blunt projections extending from a common side thereof and in a common direction, with the blunt projections extending from the linear sheet member. With the linear sheet member secured to the halter nose strap, the flap member is positioned toward the animal's nose with the halter on the animal's head.

In a preferred embodiment, the rectangular sheet member is folded with each longer opposed edge meeting at the sheet member's midline, thereby producing two interior passageways. The blunt projections, such as copper rivets with a flat, enlarged base, are inserted through the sheet member portion adjacent the member's midline from inside one interior passageway at selected distances apart. A strip of loop and hook tape is secured to each folded flap of material so that folding the fabric material at the midline secures the two flaps together. The device is installed on the nose strap of a halter by encircling the nose strap with one flap of the fabric, with the fastener tape atop the nose strap, then folding the fabric material at the midline so the fastening tape engages. The blunt projections thus project upwardly from the nose strap. The sheet member is preferably a synthetic woven material such as nylon, polyester, polyethylene, etc. for durability. The planar flap member with blunt projections is fastened to the sheet member, as described above.

When the young animal has been weaned from the mother, the device is removed from the halter nose strap for use with another animal. The device is sized to fit the halter nose strap for small, medium or large animals with equivalent results. The blunt projections of the device are of minimal length to prevent undue injury to the mother when poked by the young animal.

In an alternative embodiment of the invention, a plurality of blunt projections such as copper rivets or rigid plastic fasteners, each with a flat, enlarged base, are inserted through the nose strap of a halter with the blunt projections extending outwardly. The nose strap is preferably two layers of woven fabric stitched together, with the flat, enlarged bases of the rivets or plastic connectors there between, to prevent irritation to the nose of the animal wearing the halter.

In a further embodiment of the invention a planar flap member, having a plurality of the blunt projections on a common side, is secured to the nose strap member, as described above. The planar flap member is positioned toward the animal's nose with the halter on the animal's head.

The halter is sized to fit small, medium or large animals with equivalent results. The blunt projections of the device are of minimal length to prevent undue injury to the mother when poked by the young animal.

The invention also includes a method of weaning a young animal from nursing from its mother by securing one of the above described halter assemblies on the head of the young animal.

DESCRIPTION OF THE EMBODIMENTS

Figure 1:
FIG. 1 is a perspective view of one embodiment of the weaning halter assembly of the present invention.
Figure 2:
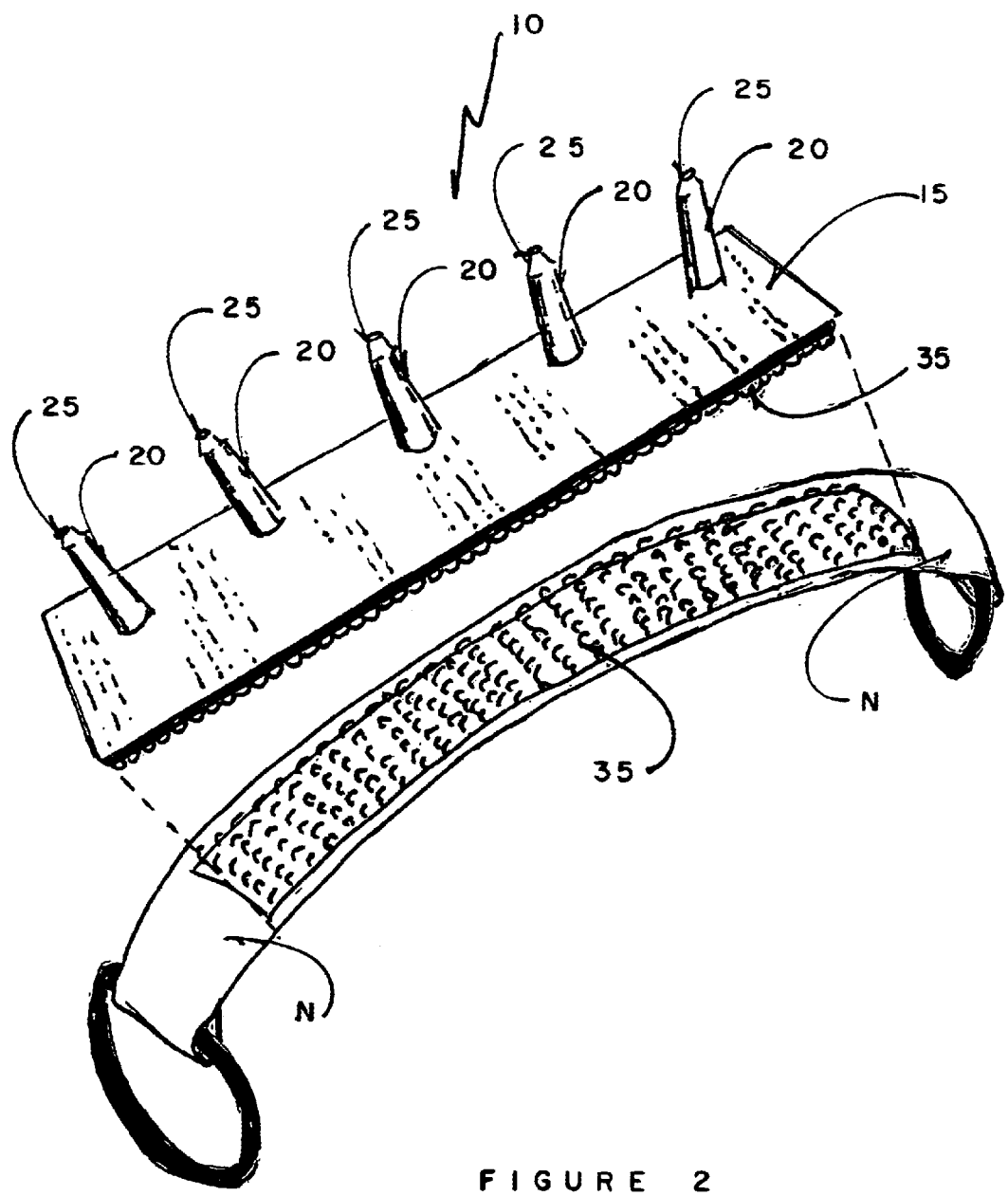
FIG. 2 is a perspective view of the weaning device of one embodiment of the present invention.

Nomenclature
H Halter
N Nose Strap
C Chin Strap
10 Projections Sheet Unit
15 Linear Sheet Member
20 Projection Members
25 Pointed, Blunt End of Projection Member
30 Flat, Base End of Projection Member
35 Hook and Loop Tape Member
40 Planar Flap Member
45 Center Section of Flap Member
50 Side Sections of Flap Member
70 Halter and Projections Assembly
75 Nose Strap Portion
Construction Referring to FIG. 1, one embodiment of the weaning device and halter assembly is shown secured on an inanimate horse head. The assembly includes a well-known halter H secured to the horse head in a conventional fashion. The halter H includes a chin strap C and a nose strap N, which encircles the nose of the animal. Secured to the halter nose strap N is the projections sheet unit 10. The unit 10 includes a linear sheet member 15 that is secured to the nose strap N. The sheet member 15 has a plurality, in this example five, of projection members 20 secured thereto. The projection members 20 are preferably copper rivets or rigid plastic connectors that are readily available commercially. The projection members 20 include a pointed, blunt end 25, protruding from a common side of the sheet member 15 and radiating therefrom, and a flat base end 30, positioned on the opposite side of the sheet member 15, best seen in FIG. 9. The sheet member 15 may be leather, but it is preferably a synthetic woven material such as nylon, polyester, polyethylene, etc. for durability. The sheet member 15 is preferably rectangular and, in one embodiment, is secured to the nose strap N with strips of hook and loop tape 35, as illustrated in FIG. 2. One strip of tape 35 is secured to the nose strap N, and the other strip of tape 35 is secured to the underside of the sheet member 15, opposite the projection blunt ends 25. The strips of hook and loop tape 35 may be stitched or glued to the sheet member 15 and the nose strap N. Thus, the sheet member 15 is readily attached to and detached from the nose strap N.

Other constructions of the sheet unit with projections 10 are contemplated with equivalent function. For example, the sheet member 15, with blunt projection members 20 protruding from a common side and flat base ends 30 positioned on the opposite side, can be permanently fastened to the nose strap N by stitching or gluing the sheet member 15 directly to the top side of the nose strap N. Various other fastening means for securing the sheet unit with projections 10 to the nose strap N can be used with equivalent results.

Figure 7:
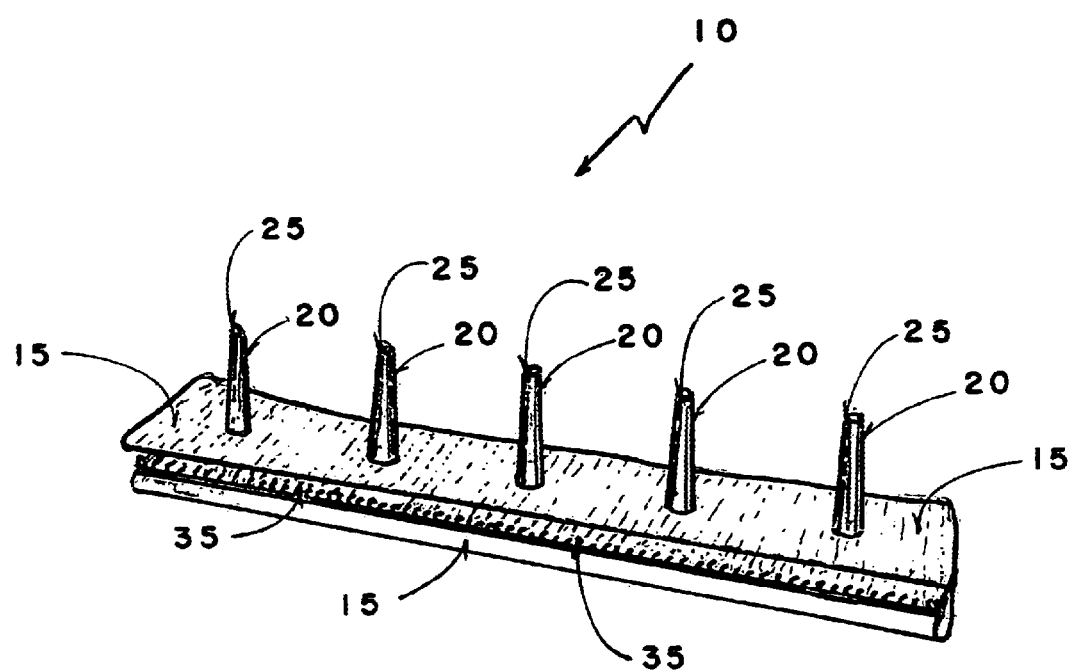
FIG. 7 is a perspective view of another embodiment of the weaning device of the present invention.
Figure 8:
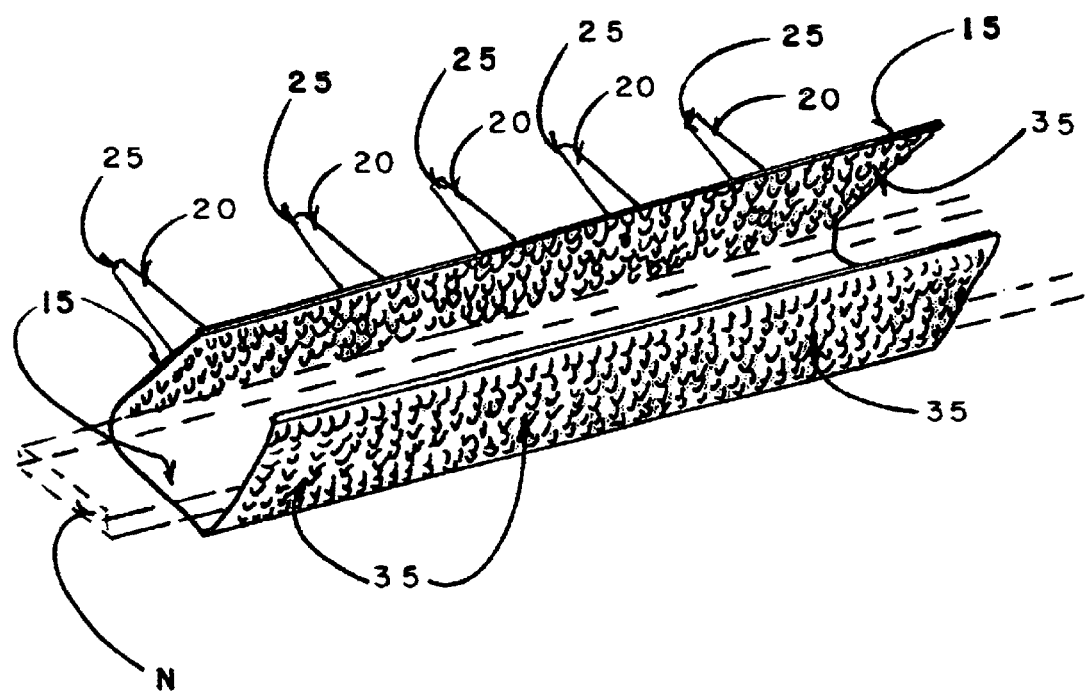
FIG. 8 is an exterior view of the embodiment of the FIG. 7 weaning device of the present invention.
Figure 9:
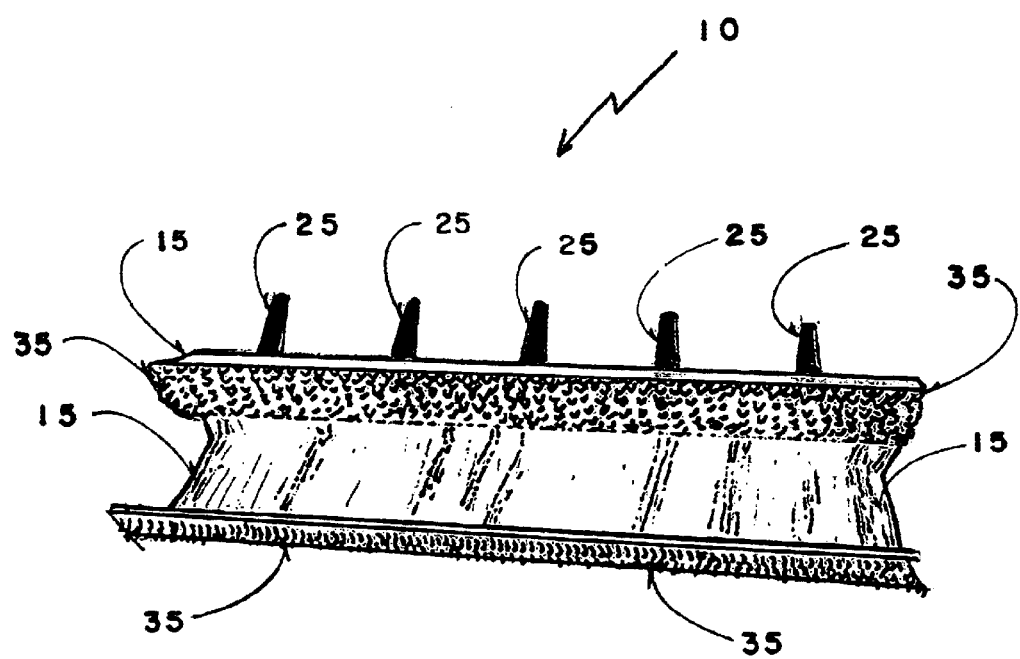
FIG. 9 is an interior view of the embodiment of the FIG. 7 weaning device of the present invention.

In another embodiment, shown in FIGS. 7–9, the sheet member 15 also is rectangular with strips of hook and loop tape 35 fastened along the longer opposed edges thereof. The projection members 20 penetrate the sheet member 15, and the sheet member 15 encircles the nose strap N, with the strips of loop and hook tape 35 secured together to cause the sheet member 15 to encircle the nose strap N. The flat base ends 30 of the projection members 20 are inside the encircling sheet member 15. This configuration of the sheet member 15 places a single layer of sheet material between the nose strap N and the animal's nose.

For any of the above embodiments, when the young animal attempts to nurse from the mother, the blunt projection ends 25 poke the mother, thereby causing the mother to move away from the young animal. Thus, the young animal is quickly weaned from the mother. The present invention allows the weaning process to occur without having to separate the mother from the young animal. The invention reduces stress and anxiety to both mother and offspring, as well as possible physical injury to the animals. After the young animal has been weaned from the mother, the sheet unit with projections 10 is removed from the halter nose band N for use with another animal. The device is sized to fit the halter nose strap N for small, medium or large animals with equivalent results. The blunt projection ends 25 of the sheet unit with projections 10 are of minimal length to prevent undue injury to the mother when poked by the young animal.

Figure 3:
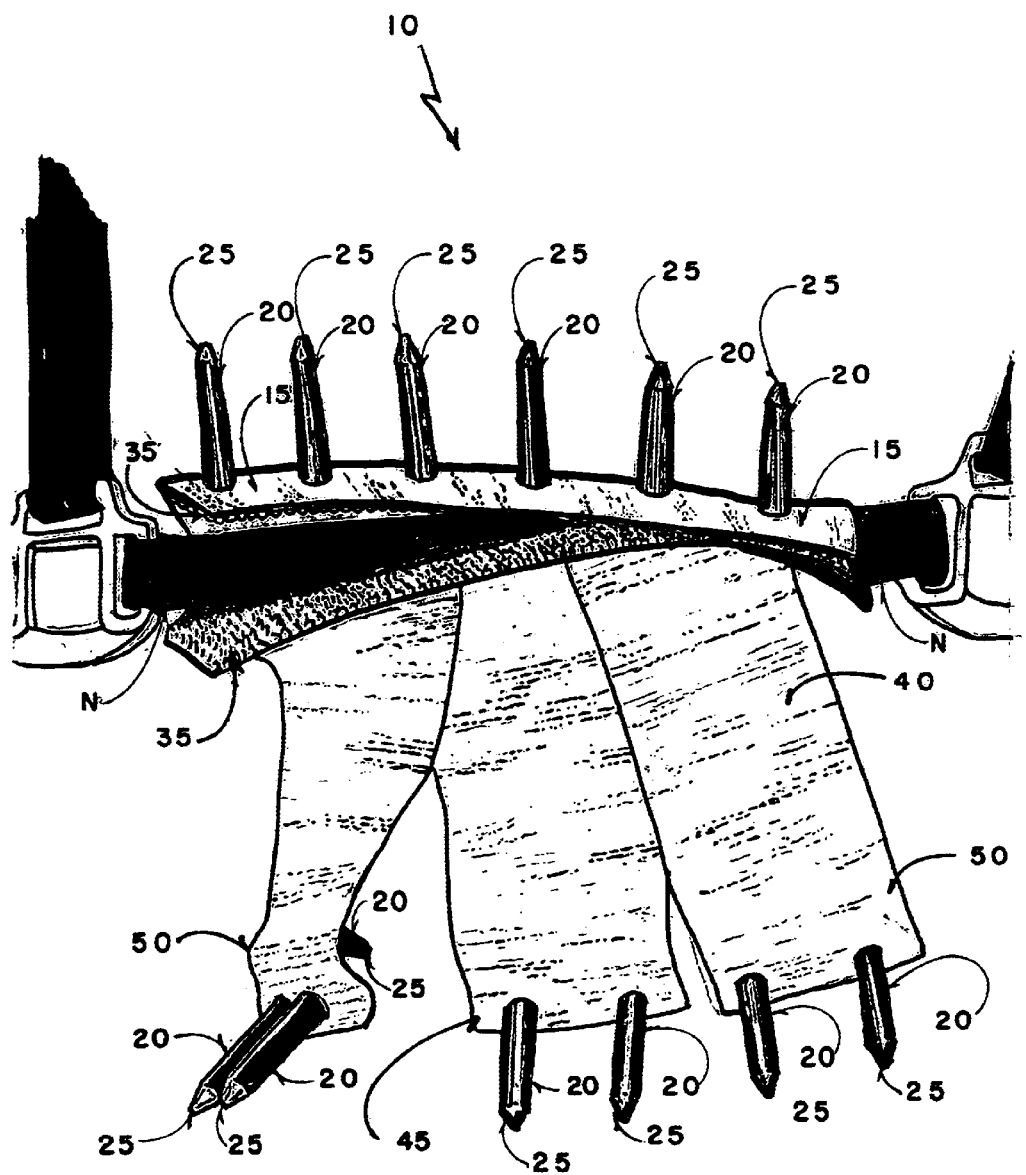
FIG. 3 is a perspective view of a further embodiment of the weaning device of the present invention.
Figure 4:
FIG. 4 is a perspective view of the further embodiment of the weaning device of the present invention.

In a further embodiment of the invention, a planar flap member 40 is secured to the linear sheet member 15. As shown in FIG. 3, the planar flap member 40 has a plurality of the blunt projection members 20, extending from a common side thereof and in a common direction with the blunt projection members 20 extending from the linear sheet member 15. With the sheet unit with projections 10 secured to the halter nose strap N, the flap member 40 is positioned toward the animal's nose with the halter H on the animal's head. Preferably, the flap member 40 is provided with a center section 45 and side sections 50, one on either side of the center section 45. Each of the three sections 45,50 includes a plurality of blunt projection members 20 extending in a common direction, as shown in FIG. 3. The three sections 45, 50 move independently of each other, with the center section 45 positioned atop the nose of the animal and the side sections 50 on each side of the animal's nose, as illustrated in FIG. 4. Thus the young animal cannot avoid contacting the mother with several of the blunt projection members 20 when attempting to nurse, even if the young animal turns its head to one side or the other.

Figure 5:
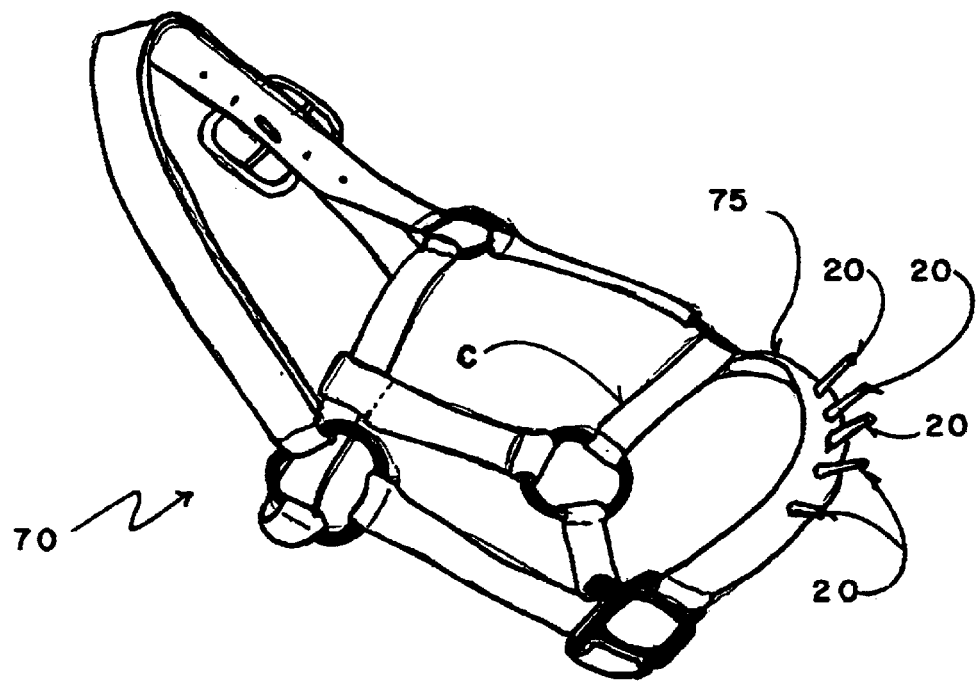
FIG. 5 is a perspective view of another embodiment of the weaning halter assembly of the present invention.

Another embodiment of the present invention is shown in FIG. 5. In this embodiment, the halter and projections assembly 70 includes a projections nose strap portion 75, where the nose strap 75 and projection members 20 are of unitary construction. The nose strap portion 75 of the halter assembly 70 includes a double thickness of woven fabric material fastened together with a plurality of projection members 20 secured thereto. The pointed, blunt end 25 of each projection member 20 is first inserted through one thickness of woven nose strap portion 75, then the two thicknesses of fabric are secured together, with the flat, base end 35 of the projection member 20 secured between the two layers. The nose strap portion 75 is incorporated into the halter assembly 70, with the projection members 20 projecting radially outward from the nose-encircling strap portion 75. The projection members 20 are preferably copper rivets or rigid plastic connectors, as describe above.

Figure 6:
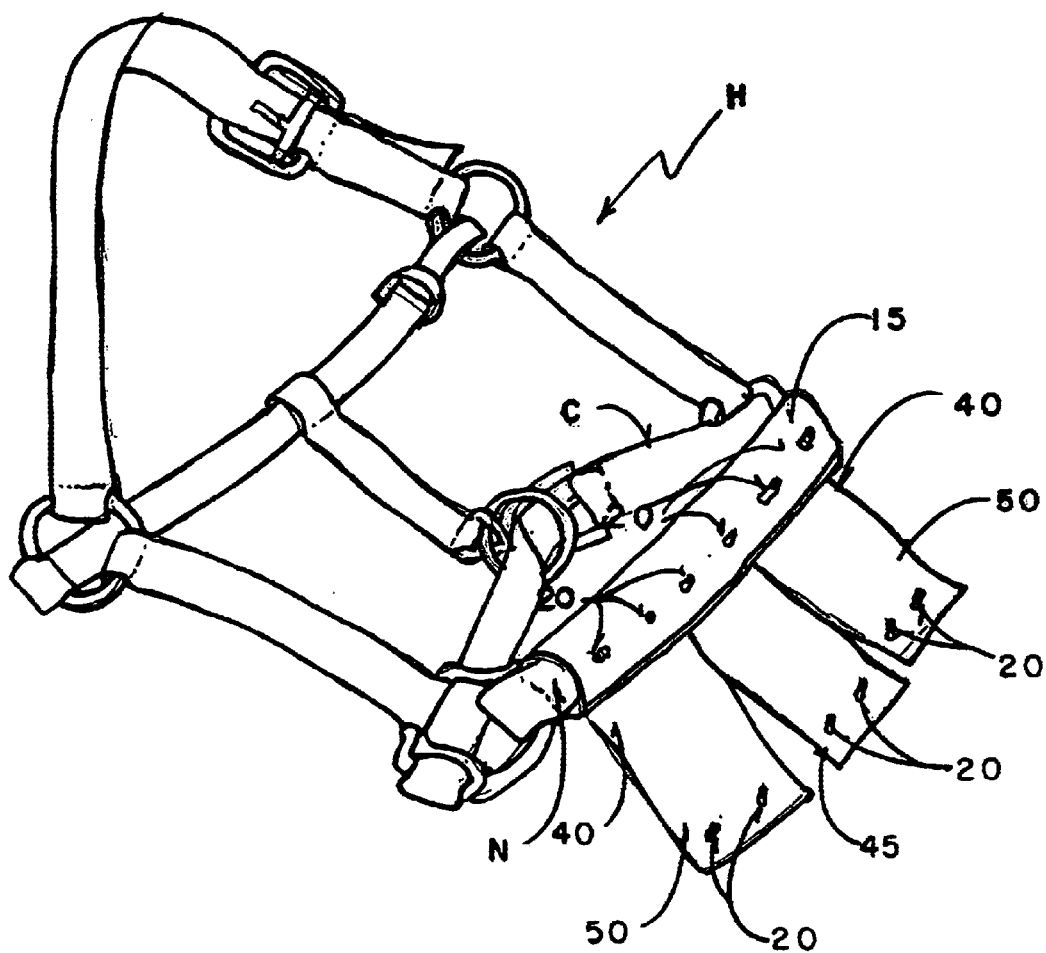
FIG. 6 is a perspective view of a further embodiment of the weaning halter assembly of the present invention.

In a further embodiment of the invention, shown in FIG. 6, a planar flap member 40 is secured to nose strap portion 75. The planar flap member 40 has a plurality of the blunt projection member 20, extending from a common side thereof and in a common direction with the blunt projection members 20 extending from the nose strap portion 75. The flap member 40 is positioned toward the animal's nose with the halter assembly 70 on the animal's head. Preferably, the flap member 40 is provided with a center section 45 and side sections 50, one on either side of the center section 45. Each of the three sections 45, 50 includes a plurality of blunt projection members 20 extending in a common direction, as shown in FIG. 6. The three sections 45, 50 move independently of each other, with the center section 45 positioned atop the nose of the animal and the side sections 50 on each side of the animal's nose, as seen in FIG. 4. Thus the young animal cannot avoid contacting the mother with several of the blunt projection members 20 when attempting to nurse, even if the young animal turns its head to one side or the other.

The halter and projections assembly 70 is sized to fit small, medium or large animals with equivalent results. The blunt projections of the device are of minimal length to prevent undue injury to the mother, when poked by the young animal.

The invention also includes a method of weaning a young animal from nursing from its mother. The method includes providing a halter member adapted for attachment about an animal's head. The halter member includes at least a nose strap portion with a plurality of blunt projection members extending outwardly therefrom. The halter member, having at least the nose strap portion with a plurality of blunt projections, is attached about the young animal's head, whereby the young animal wearing the halter member causes discomfort to the mother when attempting to nurse from the mother.

The above-described method of weaning a young animal achieves the best results when the halter member, having at least a nose strap portion with a plurality of blunt projection members extending outwardly, is applied to the young animal with proper preparation and age appropriate timing. The halter device functions on the principal of "comfort and discomfort of an animal." Proper preparation includes providing a clean and safe environment for the young animal and the mother. The halter device should fit the young animal properly. Plenty of fresh water should be available at all times for the animals. A regular feeding schedule, including mineral supplements, if needed, is maintained during the weaning process. The young animal to be weaned is to be healthy and of an appropriate age, which varies from species to species.

The descriptions above and the accompanying materials should be interpreted in the illustrative and not the limited sense. While the invention has been disclosed in connection with the preferred embodiment or embodiments thereof, it will be understood by those skilled in the art that various changes in form and details may be made therein without departing from the spirit and scope of the invention.

I claim:

1. A weaning device for an animal halter comprising:
   (a) a linear sheet member having a plurality of blunt projections extending from a common side thereof, the linear sheet member adapted to encircle at least a portion of the halter nose strap; and
   (b) fastening means adapted for securing the linear sheet member to an outer surface of a halter nose strap, with the plurality of blunt projections extending opposite nose strap, whereby a young animal wearing a halter with the weaning device causes discomfort to the mother when attempting to nurse from the mother.

2. The weaning device for an animal halter according to claim 1, wherein the linear sheet member is fabricated from a woven fiber material.

3. The weaning device for an animal halter according to claim 1, wherein the material of the blunt projections is selected from the group metal, and rigid polymer plastic.

4. The weaning device for an animal halter according to claim 1, wherein the fastening means is selected from the group hook and loop tape, stitching, and glue.

5. The weaning device for an animal halter according to claim 1, wherein the linear sheet member is detachably fastened by hook and loop tape to the halter nose strap.

6. The weaning device for an animal halter according to claim 1, further including a planar flap member secured to the linear sheet member, the planar flap member having a plurality of blunt projections extending from a common side thereof and in a common direction with the blunt projections extending from a common side of the linear sheet member.

7. The weaning device for an animal halter according to claim 6, wherein the planar flap member is fabricated from a woven fiber material.

8. The weaning device for an animal halter according to claim 6, wherein the material of the blunt projections of the planar flap member is selected from the group metal, and rigid polymer plastic.

9. A weaning halter device for animals comprising:
   a halter member adapted for attachment about an animal's head, the halter member including a nose strap portion;
   a plurality of blunt projections extending outwardly from the halter nose strap portion; and
   a planar flap member secured adjacent the nose strap portion, the planar flap member having a plurality of blunt projections extending from a common side thereof and in a common direction with the blunt projections extending outwardly from the nose strap portion, whereby a young animal wearing the weaning halter device cause discomfort to the mother when attempting to nurse from the mother.

10. The weaning halter device for animals according to claim 9, wherein the plurality of blunt projections are secured directly to the halter nose strap portion.

11. The weaning halter device for animals according to claim 9, wherein the plurality of blunt projections are secured to a linear sheet member fastened to the halter nose strap portion.

12. The weaning halter device for animals according to claim 11, wherein the linear sheet member encircles at least a portion of the halter nose strap portion.

13. The weaning halter device for animals according to claim 11, wherein the linear sheet member is detachably fastened to the halter nose strap portion.

14. The weaning halter device for animals according to claim 11, wherein the linear sheet member is detachably fastened by book and loop tape to the halter nose strap portion.

15. The weaning halter device for animals according to claim 11, wherein the linear sheet member is fabricated from a woven fiber material.

16. The weaning halter device for animals according to claim 9, wherein the material of the blunt projections is selected from the group metal, and rigid polymer plastic.

17. The weaning halter device for animals according to claim 9, wherein the planar flap member is secured at one edge to the halter nose strap portion.

18. The weaning halter device for animals according to claim 9, wherein the planar flap member is secured at one edge to a linear sheet member fastened to the halter nose strap portion.

19. The weaning halter device for animals according to claim 9, wherein the material of the blunt projections is selected from the group metal, and rigid polymer plastic.

20. The weaning halter device for animals according to claim 9, wherein the planar flap member is fabricated from a woven fiber material.

21. A method for weaning a young animal comprising the steps;
   (a) providing a halter member adapted for attachment about an animal's head, the halter member including at least a nose strap portion with a plurality of blunt projections extending outwardly therefrom, and a planar flap member secured adjacent the nose strap portion, the planar flap member having a plurality of blunt projections extending from a common side thereof and in a common direction with the blunt projections extending outwardly from the nose strap portion; and
   (b) attaching the halter member, having the nose strap portion with a plurality of blunt projections and the planar flap member having a plurality of blunt projections, about the young animal's head, whereby the young animal wearing the halter member causes discomfort to the mother when attempting to nurse from the mother.

* * * * *